Aug. 18, 1964  S. E. MANECKE  3,145,290
CONTROL DEVICE FOR ELECTRICAL OVENS
Filed Jan. 23, 1962  3 Sheets-Sheet 1

INVENTOR.
SIEGFRIED E. MANECKE
BY
Mead, Browne, Schuyler & Beveridge
ATTORNEYS

Aug. 18, 1964 S. E. MANECKE 3,145,290
CONTROL DEVICE FOR ELECTRICAL OVENS
Filed Jan. 23, 1962 3 Sheets-Sheet 2

INVENTOR
SIEGFRIED E. MANECKE
BY
Mead, Browne, Schuyler & Beveridge
ATTORNEYS

Aug. 18, 1964     S. E. MANECKE     3,145,290
CONTROL DEVICE FOR ELECTRICAL OVENS
Filed Jan. 23, 1962     3 Sheets-Sheet 3

INVENTOR.
SIEGFRIED E. MANECKE
BY
*Mead, Browne, Schuyler & Beveridge*
ATTORNEYS

United States Patent Office 3,145,290
Patented Aug. 18, 1964

3,145,290
CONTROL DEVICE FOR ELECTRICAL OVENS
Siegfried E. Manecke, Indiana, Pa., assignor to Robertshaw Controls Company, Richmond, Va., a corporation of Delaware
Filed Jan. 23, 1962, Ser. No. 168,042
6 Claims. (Cl. 219—413)

This invention relates to control devices for electric ovens, and more particularly to a thermostatically responsive switch assembly adapted to control energization of a bake and a broil heating element of an electric oven.

It is a primary object of the invention to provide a thermostatically responsive switch assembly for controlling the bake and broil heating elements of an electric oven wherein rotation of a control dial from an off position passes successively through a selected range of bake temperatures and a selected range of broil temperatures, the maximum baking temperature being greater than the minimum broiling temperature.

It is another object of the invention to provide a thermostatically responsive control device for an electric oven having separate bake and broil heating elements wherein automatic preheating of the oven over a higher range of bake temperatures is achieved.

Still another object of the invention is to provide a thermostatically responsive control device for an electric oven having separate bake and broil heating elements wherein the electrical connections of the circuit are such that switching elements having a rating substantially below the maximum current drawn by the oven may be employed in the achievement of the foregoing objects.

The foregoing, and other objects, are achieved in a control device wherein a thermostatically responsive power element of well known construction is supported within a housing for expanding and contracting movement in response to variations in oven temperature. The power element is coupled to a control dial and to the housing by a screw connection whereby rotation of the dial is employed to advance or retract the power element as a unit along the path in which the element expands and contracts to establish a selected temperature setting. Two sets of resilient contact arms are disposed in the path of movement of the power element, one behind the other, the arm adjacent to the element being movable by expanding movement of the power element away from a stationary contact against which the arm is normally biased. A set screw carried by the other of the pair of arms establishes a lost motion coupling between the two arms so that after a predetermined amount of movement of the first arm away from its contact, as by thermo expansion of the power element, the lost motion coupling is engaged and further opening movement of the first arm is transmitted to the second arm to open a second pair of electric contacts. A third normally closed contact is mounted within the device housing and is moved to an open position by a cam carried by the control dial assembly. When the dial is in its off position, the cam holds the third set of contacts open and permits them to close upon rotation of the dial away from its off position and to remain closed throughout further rotation of the dial through a normal range of bake settings. Further rotation of the dial beyond the maximum temperature bake setting causes the cam to open the third set of contacts.

The contacts are connected in circuit with an electric power source in a fashion such that when all contacts are closed the bake and the broil heating element of the electric oven are connected in parallel across a suitable power source. Opening of the first set of contacts is employed to de-energize the broil heating element, while opening of either of the other two sets of contacts will de-energize the bake element.

With the device set for operation of the bake heating element to maintain the oven at a selected temperature, the oven temperature is maintained by the thermostatically responsive cycling of the second set of contacts by the thermostatic power element. This cycling occurs only when the first set of contacts is open. During the initial heating of the oven, the first set of contacts is closed to energize the broil element in a preheat operation. This operation continues until the rising oven temperature expands the power element to break the first set of contacts at a temperature somewhat below the selected final oven temperature. Upon further heating of the oven, expansion of the power element continues to open the first set of contacts until the lost motion coupling is engaged to move the second set of contacts to their open position and to cycle them in accordance with oven temperature.

When the oven is employed for broiling, the dial operated cam holds the third set of contacts open to maintain the bake element de-energized regardless of oven temperature. In operation of the broil heating element, oven temperature is regulated by thermostatically responsive cycling of the first set of contacts by the power element.

Other objects and features of the invention will become apparent by reference to the following specification and to the drawings.

Figure 1:
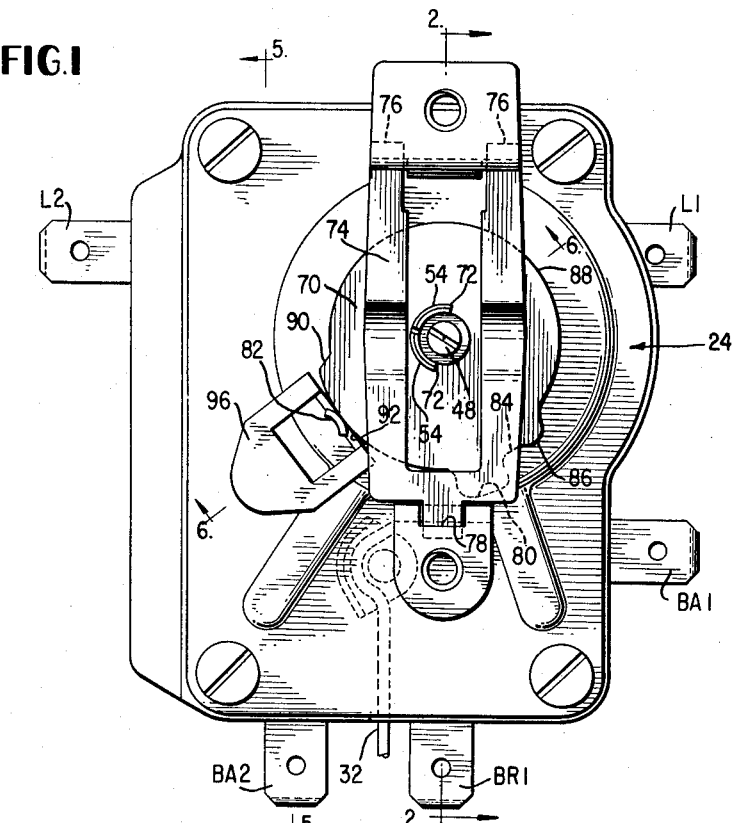
FIG. 1 is a front elevational view, with certain parts removed, of a control device embodying the present invention.

Referring first to FIGS. 1 through 6, the control device includes a housing formed by a central portion designated generally 20, a rear cover plate 22, and a front cover assembly designated generally 24. Central portion 20 and rear cover plate 22 are preferably constructed from a suitable electrically non-conductive material and a central web 26 formed as an integral portion of central portion 20 cooperates with rear cover plate 22 to define chamber 28 in which the electrical conductors and switches of the device may be enclosed. At the opposite or front side of central web 26, central portion 20 and front cover plate assembly 24 cooperate to define a chamber within which a thermally responsive power element 30 is supported, by structure to be described below, for forward and rearward movement relative to the housing structure. Power element 30 is of well known construction and includes an internal chamber connected by a tube 32 to a sensing element in the form of a bulb 34 (FIG. 4) which is physically located to sense the temperature within the interior of an electric oven chamber designated generally at 36 in FIG. 4. Bulb 34, conduit 32, and the internal chamber of element 30 are filled with a thermally responsive fluid and, upon expansion or contraction of the fluid within the flow system induced by changes in temperature in oven chamber 36, the stem or thrust button 38 of element 30 is moved horizontally from left to right or vice versa as viewed in FIG. 2 relative to the stationary base portion 40 of element 30.

Element 30 is supported within the housing by means of a compression spring 42 which is seated between central web 26 and the adjacent side of a stationary or non-expansible portion of element 30. The force exerted by spring 42 urges element 30 to the right as viewed in FIG. 2 and a stem-like projection 44 on base portion 40 is resiliently seated by the action of spring 42 against a ball 46 carried on the inner end of an adjustable set screw 48. Set screw 48 is, in turn, threadably received in an adjusting nut 50 which is threadably received within a stationary collar 52 fixedly mounted upon front cover plate assembly 24. Nut 50 is secured to the inner end of a dial shaft 54 which is rotatably journaled in a nut 56. Rotation of dial shaft 54 is employed to axially adjust nut 50 relative to stationary collar 52 to establish an initial position of base 40 of thermally responsive element 30 relative to the stationary parts of the assembly in a manner described more fully below.

In use, the control device is fixedly mounted at a suitable location upon the outer housing 58 or control panel of an oven which the device is employed to control. The mounting assembly includes a suitably formed plate 60 which is rigidly secured to front cover plate 24 as by bolts 62 and to which bolt 56 is secured as by spot welding. A mounting nut 64 is threadably received on the outer end of screw 56 to clamp a portion of mounting panel 58 and a washer 66 between nut 64 and the forward side of mounting plate 60. Dial shaft 54 projects outwardly beyond the front of mounting panel 58 and after the device is mounted on panel 58, a knob 70 (FIG. 4) having suitable temperature indicia is removably secured to the outer end of dial shaft 54 in a well known manner.

Figure 2:
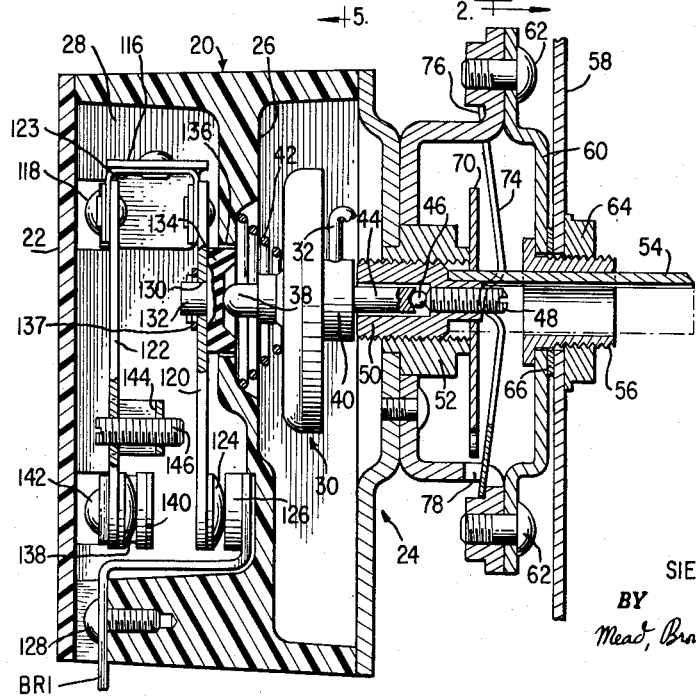
FIG. 2 is a cross-sectional view of the device of FIG. 1 taken on line 2—2 of FIG. 1 and showing additional structural elements.

Referring now particularly to FIGS. 1 and 2, a cam plate 70 is slidably received upon dial shaft 54 and rotatably locked to the dial shaft as by shoulder 72 engaging edges on shaft 54. Cam 70 is resiliently biassed into rotative sliding engagement with the outer end of collar 52 by a double arm leaf spring member designated generally 74 which is engaged at opposite ends within suitably located recesses in front cover assembly 24 as at 76 and 78. Since rotative movement of dial shaft 54 causes the shaft to advance and retract axially relative to the fixed parts of the housing, cam 70 is supported for axial sliding movement upon the dial shaft while remaining rotatably locked to the shaft.

The peripheral surface of cam 70 is formed with an outwardly projecting end limit ear 80 (FIG. 2) which, when engaged with a cam follower 82, limits rotative movement of cam 70, and hence dial shaft 54, within the device housing. Proceeding in a counterclockwise direction about the peripheral surface of cam 70 as viewed in FIG. 1, immediately adjacent limit ear 80 is a relatively short large diameter section 84 which functions in a manner to be described below and which is engaged with follower 82 when the dial is in the off position of FIG. 4. Immediately beyond portion 84, a detent-like outward projection 86 is formed on the cam periphery to provide a detent-like locking action resisting movement of the dial from the off position.

From detent projection 86, the peripheral surface of the cam fairs into a small diameter section 88 of constant diameter which extends around the cam periphery for a substantial distance from detent projection 86 to a radially inclined transition section 90 which connects the opposite end of small diameter section 88 to a second large diameter section 92 of constant diameter extending from transition 90 to the opposite side of limit ear 80.

Figure 5:
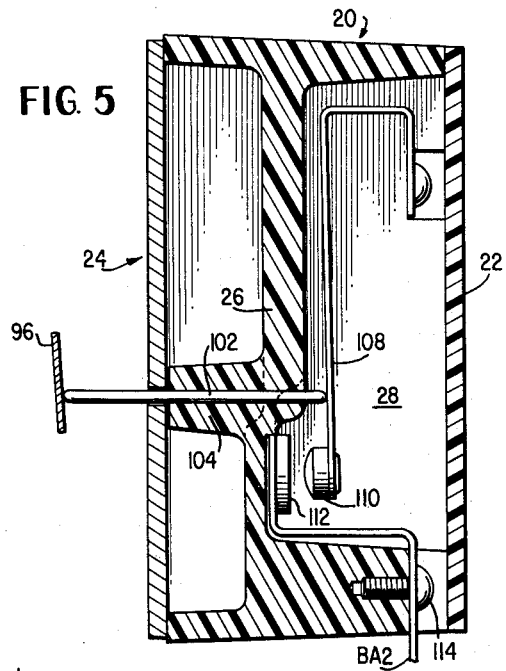
FIG. 5 is a cross-sectional view of the device of FIG. 1 taken on line 5—5 of FIG. 1.
Figure 6:
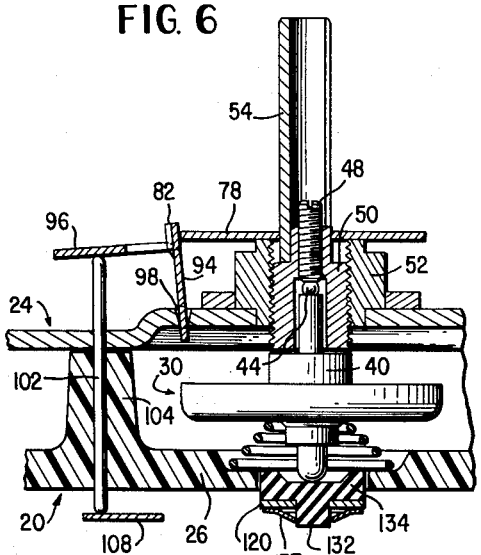
FIG. 6 is a cross-sectional view of a portion of the structure of FIG. 1 taken on line 6—6 of FIG. 1.

Referring now particularly to FIGS. 1, 5 and 6, cam follower 82 is formed on a member of sheet material having a generally vertical leg portion 94 and a generally horizontal arm portion 96. The distal end of leg 94 is received within a tapered slot 98 (FIG. 6) cut in front cover assembly 24 and so dimensioned that leg 94, and hence cam follower 92 and arm 96, are supported for pivotal movement between angular end limits defined by engagement between leg 94 and the tapered walls of slot 98.

A push rod 102 is slidably received in a projection 104 formed on central web 26 to be engaged by arm 96. The opposite end of push rod 102 abuts the resilient arm 108 of electric contact assembly, best seen in FIG. 5, arm 108 carrying a movable electric contact 110 and resiliently biassing movable contact 110 into engagement with a stationary contact 112 fixedly mounted upon central portion 20 of the housing as by a bolt 114.

Large diameter sections 84 and 92 of cam 70 are so proportioned that when cam follower 82 is engaged with either of the large diameter sections, leg 94 and arm 96 are pivoted within slot 98 in a direction urging push rod 102 to the right, as viewed in FIG. 5, a sufficient distance such that movable contact 110 is moved out of engagement with stationary contact 112, as shown in FIG. 5. Small diameter section 88 of cam 70 is so dimensioned that when cam follower 82 is in engagement with section 88 the resilience of arm 108 can shift movable contact 110 into engagement with stationary contact 112 by driving push rod 102 to the left as viewed in FIG. 5, slot 98 permitting sufficient free pivotal movement of the cam follower member to permit the contacts to close.

As indicated in FIGS. 7 through 10, opening and closing of contacts 110 and 112 is employed by the control device in controlling the energization of the Bake heating element designated "Bake" in the drawings. Because the open or closed position of contacts 110 and 112 is purely a function of the rotative position of the dial, the device is provided with other contacts, to be described below, which are opened and closed in response to the temperature existing within oven chamber 36 to provide an automatic thermostatic control of heating of the oven. These last mentioned contacts are controlled by power element 30 and are best shown in FIG. 2 of the drawings.

Referring to FIG. 2, an electrically conductive bridge member 116 is fixedly mounted upon central portion 20 of the housing as by a bolt 118 (FIG. 2) to support a pair of contact carrying arms 120 and 122 by means of a resilient hinge spring 123. Arm 120 carries, at its lower end, a movable contact 124 which is normally biassed by the resiliency of hinge 123 into engagement with a stationary contact 126 fixedly mounted upon central web 26 as by a bolt 128. A bore 130 in arm 120 receives an integral pin 132 of a thrust plug 134 loosely supported in a bore 136 in central web 26 for sliding movement from left to right or vice versa as viewed in FIG. 2. Plug 134 is secured to arm 120 as by a clip 137. The opposite side of thrust plug 134 is engaged by the reciprocable thrust button or stem 38 of power element 30 and, from FIG. 2, it is believed apparent that reciprocal movement of thrust button or stem 38 to the left from the FIG. 2 position, occasioned by a thermally induced expansion of the fluid contained within power element 30, will flex contact carrying arm 120 to the left as viewed in FIG. 2 to shift movable contact 124 out of engagement with stationary contact 126.

Contact arm 122 is mounted directly behind contact arm 120 and carries a movable contact 138 at its lower end which is resiliently biassed, by arm 122, into engagement with a stationary contact 140 fixedly secured to central web 26 as by a bolt 142. A web member 144 is formed as an integral portion of arm 122, cooperates with the main portion of the arm to threadably receive an adjustable set screw 146 which forms a lost motion abutment for transmitting movement of arm 120 to arm 122. From FIG. 2 it is seen that upon continuous movement of thrust button 38 to the left as viewed in FIG. 2, arm 120 will first be flexed to break the contact between movable contacts 124 and 126, and upon further leftward movement of arm 120 induced by leftward movement of thrust button 38, arm 120 will move into abutment with the right-hand end of set screw 146 and further leftward movement of arm 120 will shift arm 122 to the left to break the engagement between contacts 138 and 140.

Figure 3:
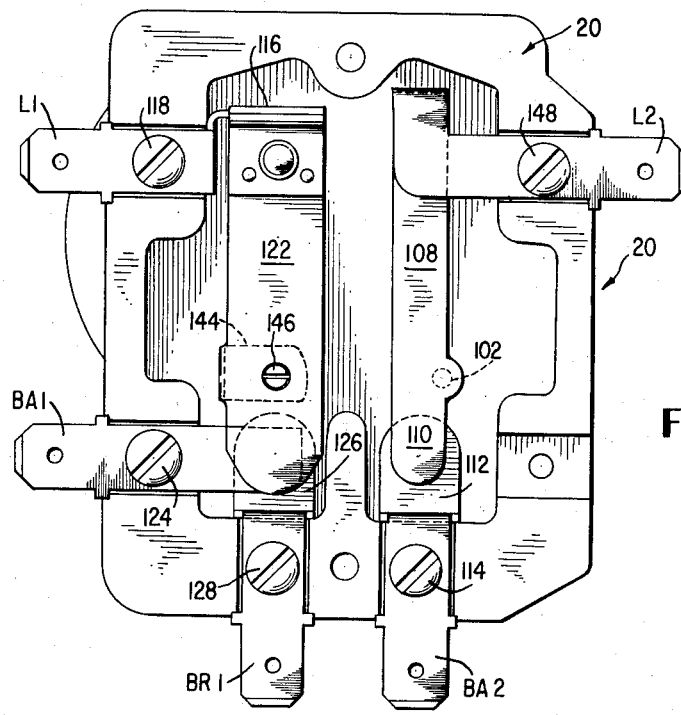
FIG. 3 is a rear elevational view of the device of FIG. 1 with the rear cover plate removed.

As best seen in FIG. 3, all of the various contacts are directly connected electrically to various projecting terminal lugs to which the external circuit connection of the device can be easily made. These connections are schematically illustrated in FIGS. 7 through 10 inclusive. Thus, arm 108, carrying movable contact 110, is formed with an integrally projecting terminal lug L2, fixedly secured to central portion 20 by a bolt 148. Stationary contact 112, which is engaged by movable contact 110 is connected to a terminal BA2. Bridge portion 116 which mechanically and electrically connects arms 120 and 122 and their respective movable contacts 124 and 138 is connected to a terminal lug L-1. Stationary contact 126 is connected to a terminal BR-1, while stationary contact 140 is mechanically and electrically connected to a fifth terminal BA-1. The external circuit connections of the various terminals are best shown in FIGS. 7 through 10 inclusive, terminals L-1 and L-2 being connected to opposite sides of a suitable source of electrical power, not shown. Terminal L-2 is commonly connected to one side of the broil heating element, the other side of the broil heating element being connected to terminal BR-1, so that energization of the broil heating element is controlled by movable contact 124 which, when engaged with fixed contact 126, connects the broil heating element across the supply line from terminal L-2 through the broil heating element to terminal BR-1, and thence through contacts 126 and 124 to terminal L-1. Terminal L-2 is connected through movable contact 110 and stationary contact 112 to terminal BA-2 which is connected to one side of the bake heating element. The circuit through the bake heating element proceeds from terminal BA-2 through the bake element to terminal BA-1, and thence from fixed contact 140 to movable contact 138 to line terminal L-1.

Figure 4:
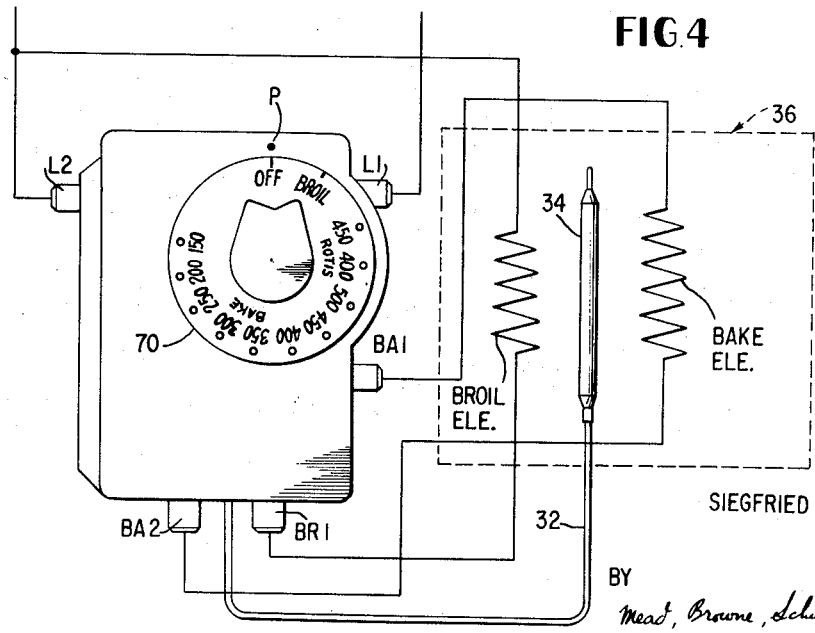
FIG. 4 is a front elevational view of the device of FIG. 1 combined with a schematic showing of the electrical circuit employed with the device and its general relationship to an electric oven.
Figure 7:
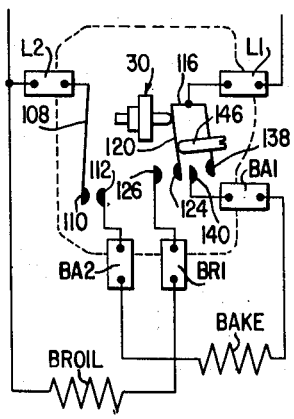
FIG. 7 is a schematic diagram of the device of FIG. 1 and the electrical circuit showing the positions of the parts when the device is in its off position.

When the circuit connections are made as indicated in FIGS. 7 through 10, operation of the device is as follows. With the dial set in its off position, as shown in FIG. 4, cam 70 is so positioned that cam follower 82 is engaged with large diameter section 84 of the peripheral surface of the cam, located between stop ear 80 and detent projection 86. Since cam follower 82 is, at this time, engaged with a large diameter portion of the cam, arm 96 is tilted to the position shown in FIGS. 5 and 6, and push rod 102 is shifted resilient arm 108 to the FIG. 5 position to disengage movable contact 110 from stationary contact 112, this situation being shown in the electrical schematic diagram of FIG. 7. With contacts 110 and 112 disengaged, the circuit between terminals L-1 and L-2 through the bake element is broken. With the control dial in its off position, the rotative position of dial shaft 54 is such that power element 30 has been advanced to its extreme left-hand or forward degree of travel, and is at a position substantially to the left of that shown in FIG. 2 so that, with oven chamber 36 at ambient or room temperature, thrust button 38 has forced arm 120 a sufficient distance to the left from the FIG. 2 position to break engagement between contacts 124 and 126 and further to have broken the engagement between contacts 138 and 140 so that the electrical connections are as shown in FIG. 7.

Referring now to the control dial as shown in FIG. 4, proceeding around the dial in a counterclockwise direction from the off position which is aligned with a stationary index mark P, the control dial is marked with a bake section with temperatures indicated on the periphery of the dial increasing in a counterclockwise direction from a 150° setting to a 500° setting. Clockwise rotation of the control idal from the position shown in FIG. 4 to align the 300° base setting with the index pointer or mark initiates the following action within the device.

First, rotation of the control dial rotates cam 70 to a position such that cam follower 82 is engaged with the small radius portion 88 of the cam, hence permitting arm 96 to rotate upwardly from the FIG. 6 position—to the left as viewed in FIG. 5—thereby permitting the resilience of arm 108 to drive movable contact 110 into engagement with stationary contact 112. This action, now referring to FIG. 8, completes the electrical circuit from line terminal L-2 to the bake element terminal BA-2.

The foregoing rotation of the control dial moves power element 30 to the right, as viewed in FIG. 2, from the previously described off position and, for a 300° bake setting, would locate the power element in approximately the position shown in FIG. 2. Clockwise rotation of the control dial shifts power element 30 to the right as viewed in FIG. 2 because the threaded engagement between adjusting nut 50 and collar 52 is a left-handed thread.

Figure 8:
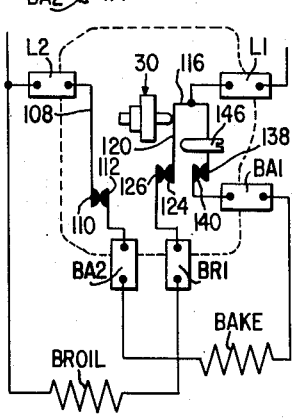
FIG. 8 is a view similar to FIG. 6 showing the device in a preheat condition.

The foregoing rightward movement of power element 30 shifts the power element and its thrust button or stem 38 to the right, as viewed in FIG. 2, a sufficient distance from the off position to permit contact 138 to engage contact 140, and also to permit contact 124 to engage contact 126 as shown in FIG. 2 and illustrated in the schematic diagram of FIG. 8. As best seen in FIG. 8, this action completes the circuit between line terminal L-2 and line terminal L-1 through the bake element from terminal BA-2 to terminal BA-1 and thence through contacts 140 and 138 to line terminal L-1. This action also energizes the broil heating element by virtue of the closing of contacts 124 and 126. Thus, by setting the control dial to a 300° bake setting, both the bake heating element and the broil heating element are initially energized by the electrical connections as indicated in FIG. 8. However, as the interior of oven chamber 36 begins to heat up, the increase in temperature causes expansion of the fluid within sensing bulb 34 and its conduit 32, thus causing the thermally responsive fluid in power element 30 to expand to shift thrust button or stem 38 to the left as viewed in FIG. 2 as the temperature rises within oven chamber 36. When the temperature rises a sufficient amount, the leftward movement of thrust button or stem 38 flexes contact arm 120 to the left as viewed in FIG. 2 to break the engagement between contacts 124 and 126, as shown electrically in FIG. 9, thereby de-energizing the broil heating element. The breaking of contacts 124 and 126 occurs at some temperature below the desired oven temperature of 300°, and the initial energization of the broil element is employed solely as a preheating feature to rapidly elevate the temperature of the oven when it is first turned on so that the desired final temperature can be reached rapidly.

Figure 9:
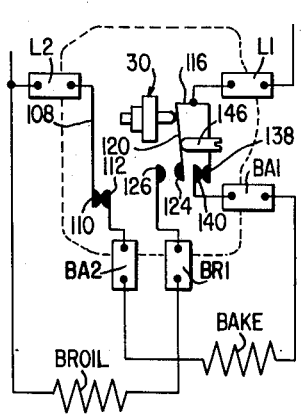
FIG. 9 is a view similar to FIG. 6 showing the device in a normal bake position.
Figure 10:
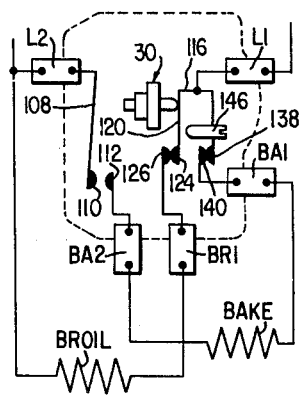
FIG. 10 is a view similar to FIG. 7 showing the device in a normal broil condition.

Upon further heating of the oven, by energization of the bake element which, as indicated in FIG. 9, is still energized after the de-energization of the broil element, the oven temperature eventually reaches the desired 300° and at this time, the outward movement of thrust button 38 has reached a point such that arm 120 moves into engagement with set screw 146 when the oven temperature reaches 300°. A further rise in temperature within the oven expands thrust button 38 to a point sufficient to break the contact between contacts 138 and 140, thus de-energizing the bake heating element. Upon subsequent cooling of the oven to a point below the desired 300° setting, contact 138 moves back into engagement with contact 140 to energize the bake heating element, thereby restoring the oven temperature to the desired setting.

Since preheating of the oven for baking purposes is desirable primarily when a relatively high oven temperature is wanted, the structural relationship of the mounting of power element 30 and the closed position of contacts 124 and 126 is such that with the fluid in sensing bulb 34, conduit 32 and power element 130 at substantially ambient or room temperature, contacts 124 and 126 do not close upon rotation of the control dial from an off position until a 200° bake setting is selected by the dial. The differential between the point at which preheating is terminated by de-energization of the broil element and the final desired oven temperature is determined by adjustment of screw 146.

Thus, regardless of the selected temperature for a baking operation, the bake heat element is energized and de-energized in accordance with the oven temperature under the control of contacts 138 and 140 which are opened and closed in response to variations in oven temperature by the thermally responsive power element 30. At higher temperature bake settings, a preheating cycle is automatically supplied in which the broil heating element is connected across the power supply in parallel with the bake heating element to assist in rapidly elevating the oven temperature.

To set the device for broiling, the control dial is rotated in a clockwise direction as viewed in FIG. 4 to some point beyond the 500° bake setting. This action rotates cam 70 to a position such that large diameter section 92 is engaged with cam follower 82 to depress arm 96 and thus, through push rod 102, disengage movable contact 110 from stationary contact 112. Transition section 90 of cam 70 is engaged with cam follower 82 when index pointer P is aligned with that portion of the control dial between the 500° bake setting and the next adjacent 400° setting over the section marked "rotis." The "rotis" marking on the control dial is employed in certain cases where the oven is provided with a rotating spit or rotisserie which is operated in conjunction with the broil heating element. However, functionally, at settings of the device where cam follower 82 is in engagement with large diameter section 92 of the cam, the device functions to thermostatically control heating of the oven by the broil element alone.

Since, as described above, engagement of cam follower 82 with enlarged diameter section 92 opens contacts 110 and 112, the bake element is permanently de-energized. Rotative movement of the dial to a position such as the 450° "rotis" setting draws power element 30 somewhat further to the right than the FIG. 2 position so that a greater thermally induced expansion of the fluid within power element 30 is required before its thrust button or stem 38 unseats contact 124 from contact 126. Thus, when the control device is set to thermostatically control operation of the broil heater element alone, the action is precisely similar to operation of the device if an extremely high—say 600° bake setting were imposed. Because of the fact that the brake heating element cannot be energized during this portion of dial settings, thermostatically controlled cycling of the broil heater element contacts 124 and 126 provides a thermostatically controlled range of operation of the broil element which is coextensive with a portion of the range of thermostatically controlled operation of the bake element by the same thermostatic control mechanism.

It should be noted that when both of the bake and broil heating elements are connected to the supply circuit as indicated in FIG. 8, the two elements are connected in parallel and thus the current load applied to the various contacts is approximately one-half of the total amperage drawn by the oven. This enables the contacts employed in the described device to achieve satisfactory operation when the contacts are rated at only 15 amps in contrast to the normally required 30 amp rating for oven control devices of this general type.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. A control device for controlling the electrical connection of a bake heating element and a broil heating element of an electric oven to a source of electric power, said device comprising a frame, a thermally responsive means including a sensing element for sensing the temperature of the oven and a stem supported in said frame for forward and rearward movement relative to said frame in response to an increase or decrease in oven temperature sensed by said sensing element, first normally closed switch means operable when closed to connect said broil element to said electric power source, said first switch means being movable by said stem to an open position to disconnect said broil element from said power source upon forward movement of said stem to a given position relative to said frame, dial means for shifting said stem element relative to said frame toward and away from said given position to thereby adjustably select the desired oven temperature at which said switch means is opened by said stem, second normally closed switch means operable when closed to connect said bake element to said power source in parallel with said broil element, and means operable upon movement of said stem forwardly a predetermined distance beyond said given point for opening said second switch means to disconnect said bake element from said power source.

2. A control device as defined in claim 1 wherein said first normally closed switch means comprises a fixed contact mounted on said frame and a movable contact mounted on said frame for movement toward and away from engagement with said fixed contact, said means for transmitting movement of said stem to said second switch means comprising an adjustable abutment mounted on said second switch means and disposed in the path of movement of said movable contact to be engaged thereby upon movement of said movable contact subsequent to the opening of said first switch means to move said second switch means to its open position upon an increase in oven temperature to a selected temperature above that at which said first switch means is opened.

3. A control device as defined in claim 1 further comprising third normally closed switch means connected in series with said bake element and said power source, and means operable by said dial means to open said third switch means when said stem is shifted by said dial means rearwardly beyond a selected position relative to said frame.

4. A control device for controlling energization of a first heating element and a second heating element of an electric oven comprising a housing, a thermally responsive means including an element mounted in said housing for movement along a first path in proportional response to the temperature within said oven, a first and a second normally closed contact means mounted in said housing in said first path to be opened by movement of said thermally responsive element in response to an increase in oven temperature, said first contact means being opened by said element at a first selected oven temperature and said second contact means being opened when the oven temperature increases to a second selected temperature which exceeds said first temperature by a selected amount, dial means mounted in said housing for rotation between an off position and an opposite angular end limit, means coupling said thermally responsive element to said dial means for movement along said first path upon rotation of said dial means between a first end limit corresponding to said off position wherein said thermally responsive element maintains both of said first and said second contact means open when said oven is at ambient temperature and a second end limit corresponding to said opposite angular end limit wherein a maximum thermally induced expansion of said thermally responsive element is required to open said first contact means, a third normally closed contact means in said housing, said dial being operable at rotative positions intermediate said end limits to locate said element on said path at a selected distance from said first contact means to thereby select said first selected temperature, cam means on said dial for opening said third contact means when said dial means is at said off position and when said dial means is within a preselected range of angular movement from said opposite end limit, and circuit means for connecting said heating elements and said contact means in two parallel circuit branches with said first heating element and said first contact means connected in series in one of said branches and with said second heating element and said second and said third contact means connected in series in the other of said branches.

5. For use in combination with an electric oven having a first heating element and a second heating element, and an electric power source; a control device for selectively connecting said heating elements to said source comprising a housing, a first, a second, and a third contact pair in said housing, each contact pair including a fixed contact and a movable contact normally biassed against the fixed contact and movable into and out of engagement with the fixed contact to open or close the contact pair, means for interconnecting said contact pairs in circuit with said power source and with said heating elements to connect both heating elements in parallel across said source when all of said contact pairs are closed, said first contact pair being connected in said circuit to deenergize said first heating element when said first contact pair is opened, said second and third contact pairs being connected in said circuit to de-energize said second heating element when either of said second and third contact pairs is opened, a thermally responsive element mounted in said housing in operative relationship with the movable contact of said first contact pair to open said first contact pair when the temperature in said oven increases above a first selected temperature, dial means on said housing for adjustably locating said thermally responsive element at selected distances from the movable contact of said first contact pair to thereby adjustably select the amount of thermally induced movement of said thermally responsive element necessary to open said first contact pair, lost motion means for transmitting movement of the movable contact of said first contact pair to the movable contact of said second contact pair to open said second contact pair at a second selected temperature greater than said first selected temperature, and manually operable means for opening said third contact pair.

6. For use in combination with an electric oven having a first heating element and a second heating element, and an electric power source; a control device for selectively connecting said heating elements to said source comprising a housing, a first, a second, and a third contact pair in said housing, each contact pair including a fixed contact and a movable contact normally biased against the fixed contact and movable into and out of engagement with the fixed contact to open or close the contact pair, means for interconnecting said contact pairs in circuit with said power source and with said heating elements to connect both heating elements in parallel across said source when all of said contact pairs are closed, said first contact pair being connected in said circuit to deenergize said first heating element when said first contact pair is opened, said second and third contact pairs being connected in said circuit to de-energize said second heating element when either of said second and third contact pairs is opened, a thermally responsive element mounted in said housing in operative relationship with the movable contact of said first contact pair to open said first contact pair when the temperature in said oven increases above a first selected temperature, dial means on said housing for adjustably locating said thermally responsive element at selected distances from the movable contact of said first contact pair to thereby adjustably select the amount of thermally induced movement of said thermally responsive element necessary to open said first contact pair, lost motion means for transmitting movement of the movable contact of said first contact pair to the movable contact of said second contact pair to open said second contact pair at a second selected temperature greater than said first selected temperature, and means on said dial means for opening said third contact pair when said temperature responsive element is initially located at a distance from the movable contact of said first contact pair greater than a selected distance.

References Cited in the file of this patent
UNITED STATES PATENTS

| | | |
|---|---|---|
| 2,786,990 | Garner | Mar. 26, 1957 |
| 2,943,177 | Wantz et al. | June 28, 1960 |